United States Patent [19]

Siegel

[11] 4,017,735
[45] Apr. 12, 1977

[54] ULTRAVIOLET LIQUID STERILIZER

[76] Inventor: Arthur D. Siegel, 24 Goldenrod Court, Cheshire, Conn. 06410

[22] Filed: Oct. 24, 1975

[21] Appl. No.: 625,557

[52] U.S. Cl. .............................. 250/430; 21/DIG. 2; 210/169; 250/435

[51] Int. Cl.² ...................... E04H 3/16; E04H 3/20; G01N 21/24; G01N 23/12

[58] Field of Search .......... 250/434, 435, 437, 438, 250/432, 430, 455; 417/108; 21/DIG. 2; 210/169

[56] References Cited

UNITED STATES PATENTS

| | | | |
|---|---|---|---|
| 2,744,065 | 5/1956 | Lacey | 417/108 X |
| 3,246,144 | 4/1966 | Beall et al. | 250/436 |
| 3,535,513 | 10/1970 | Cirami | 250/430 |

Primary Examiner—Alfred E. Smith
Assistant Examiner—T. N. Grigsby

[57] ABSTRACT

A liquid sterilizer comprising an enclosure containing an ultraviolet lamp, an air lift pump to deliver turbulent, aerated liquid to the lower wall of the enclosure, and drain holes in the lower wall to return the liquid by gravity to the liquid tank. The enclosure is clamped to the edge of the tank of liquid with the lower wall of the enclosure close to the liquid surface and with the tube of the air lift pump immersed in the liquid. Air bubbles discharged at the lower end of the lift pump tube carry liquid to the enclosure.

4 Claims, 2 Drawing Figures

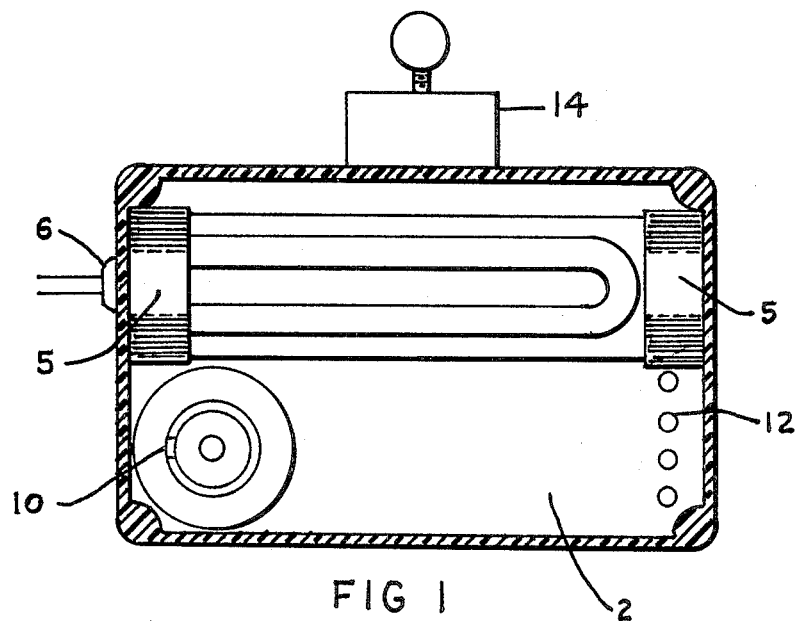
FIG 1
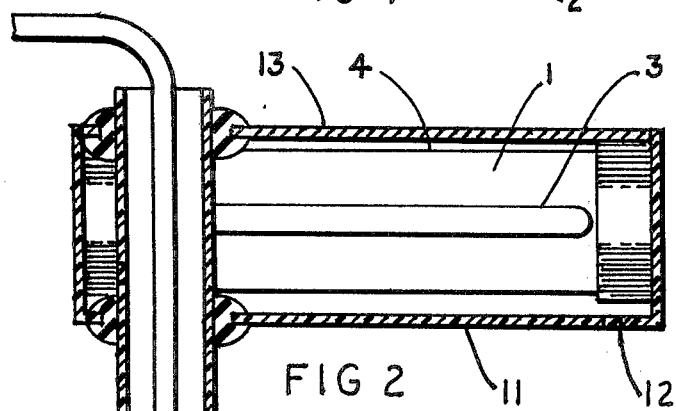
FIG 2
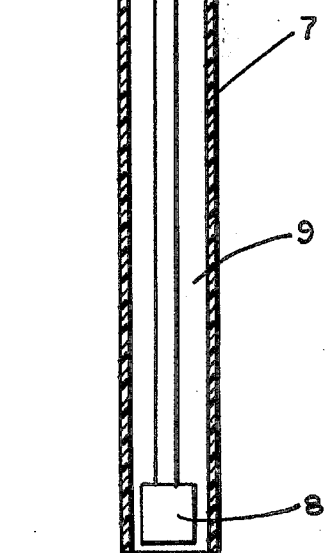

ULTRAVIOLET LIQUID STERILIZER

BACKGROUND OF THE INVENTION

This invention relates to a method for the continuous sterilization or disinfection of liquids or liquid streams by combining the effect of ultraviolet (UV) energy with turbulence and aeration resulting from the introduction of air bubbles in the liquid and to the apparatus for carrying out this method.

Ultraviolet radiation, whose main wave length are of the order of between 1800 Angstroms and 4000 Angstroms, has been used in the past for water purification when it was dangerour or not practical to chlorinate or chemically treat the water. For example, ultraviolet sterilizers are used to purify tanks of water inhabited by fish or other aquatic life. In general, water is removed from the tank, by a pump and passed through an enclosure containing an ultraviolet light source after which the water returns to the tank. After a period of time the circulation of water through the ultraviolet purifier will reduce the number of bacteria within the tank water to minimum value expressed as the number or organisms per milliliter of water. Further reduction of bacterial can be achieved only by increasing the intensity of the ultraviolet radiation or by improving the efficiency of the system.

The UV energy falling on a surface at a given distance from an ultraviolet lamp is expressed in microwatts per square centimeter. The closer the surface is to the lamp the greater the intensity of the ultraviolet energy that falls on this surface.

This UV energy must be applied to a bacteria for a given amount of time in order to destroy it. For example, the bacillus anthracis requires an exposure of 8700 microwatt seconds per square centimeter for complete destruction. This means that bacteria can be destroyed by high energy for a short time or low energy for a long time.

In a closed system where the liquid is returned to the tank after purification equilibrium is reached between the rate at which bacteria are destroyed and the rate of which the bacteria reproduce themselves. If the flow through the ultraviolet purification chamber is reduced to increase the exposure time, the resulting increase in kill rate may be compensated for by an increased breeding time within the tank.

In liquids there is a critical distance from the ultraviolet lamp at which 90% of the germicidal energy has been absorbed. This leaves 10% of the energy to be transmitted to the liquid beyond that distance and to the absorbent walls of the enclosure. The distance for a 90% absorption, called the effective depth of penetration, may vary upwards from a few thousands of an inch in milk and serums to 5 inches for some drinking water. For this reason a certain amount of the liquid that passes through the ultraviolet chamber is shielded from the sterilization effect of the lamp by intervening liquid, thus reducing the efficiency of the purifier.

The typical sterilizer in use today depends upon baffles within the liquid chamber to cause turbulance, and direct as much of the flow as possible to within the effective germicidal range of the UV lamp. Because the baffles are not a very efficient means of controlling the liquid flow, much of the liquid that passes through the sterilizer if untreated by the radiation. This requires recirculation for complete sterilization and the consequence unnecessary movement of liquid is that not being treated.

If the UV lamp is immersed in the liquid, the cooling effect of the liquid can greatly reduce the UV energy output of the lamp.

It is an object of this invention to provide a means of achieving a more efficient sterilization of liquids that pass under ultraviolet germicidal lamps.

It is also an object of this invention to reduce the liquid flow rate required by commercial ultraviolet sterilizers without lowering the percent kill of bacteria.

A further object of this invention to overcome the reduced sterilizer efficiency caused by the cooling effect of liquid in contact with the UV lamp.

A still further object of this invention is to eliminate slime buildup on the outside surface of the UV lamp.

Another object of the invention is to prevent spattering of the UV lamp caused by bursting liquid bubbles.

It is also an object of this invention to reduce the electrical hazard of ultraviolet sterilizers.

These and other objects, advantages, features and uses of the present invention will be apparent during the course of the following discussion.

SUMMARY OF THE INVENTION

The present invention provides an improved ultraviolet fluid sterilizing apparatus which is designed to avoid or minimize the above-discussed inefficiencies resulting from partially or totally untreated fluid passing through the sterilizer. Preferable, the fluid to be treated should pass in a thin, turbulant film under the ultra violet lamp. To achieve this result, I provide an enclosure with the ultraviolet lamp suspended in the upper portion. The liquid to be sterilized flows across the lower wall of the enclosure in a thin film. The liquid does not touch the lamp or surrounding protective quartz sleeve, therefore, slime cannot build up on the sleeve, electrical insulating requirements are not as severe as with submerged lamps, and the efficiency of the lamp is not reduced by the cooling effect of the fluid.

To insure that the fluid is turbulent and well aerated, I provide an air lift pump which transports the liquid from the tank to be sterilized and delivers it to the inside of the above described enclosure. The liquid returns to the tank through drain holes. The port through which the liquid is received by the enclosure faces the vertical wall of the enclosure. This causes bubbles entering the enclosure to break before passing under the UV lamp, thus preventing the lamp from being spattered by breaking bubbles.

DESCRIPTION OF DRAWINGS

In the accompanying drawings, forming a part of this application, and in which like numerals are employed to designate like parts throughout the same FIG. 1: is a sectional view, taken on the line 1—1 of FIG. 2, viewed in the direction of the arrows;

FIG. 2: is a diagrammatic longitudinal view in section of the processing chamber for carrying out the method of this invention, utilizing a vertical air lift tube.

DESCRIPTION OF PREFERRED EMBODIMENT

Referring to FIG. 2, the numeral 1 designates the ultraviolet lamp housing which is suspended in the upper portion of the enclosure 2.

The UV lamp 3 is contained within a quartz sleeve 4. The sleeve 4 is sealed at both ends with a vinyl caps 5.

The electrical cord enters through a water tight grommet 6 in the center of one cap. The purpose of the quartz sleeve is to provide a water tight envelope for the UV lamp. Quartz is used for this sleeve because it transmits most of the germicidal UV radiation. The length of the sleeve with end caps is such to provide a wedge fit with the enclosure. In addition, one end of the envelope is supported by the grommet 6 which fits in a hole cut in the side of the enclsoure 2.

The air lift pump consists of vertical tube 7 extending through the enclosure 2.

The enclosure 2 is clamped to a tank of liquid with the lower wall 11 close to the liquid surface and with the tube 7 submerged in the liquid. An air stone 8 introduces an air bubble in the lower portion of the tube 7, causing liquid 9 to rise in tube 7. The liquid exits from the tube 7 through discharge opening 10 which communicates with the enclosure 2. The fluid then flows by gravity across the lower wall 11 of enclosure 2 and exit the enclosure through drain holes 12. The upper wall 13 of the enclosure, is made of a plate of bright dipped and anodized aluminum. This plate increases the amount of UV radiation reflected to the liquid. A clamp 14 mounted on the rear of the enclosure attaches the apparatus to the tank to be sterilized.

Without limitation of the scope of the invention the following example is given to illustrate the efficiency of the invitation.

EXAMPLE

In this test a sterilizer of the type shown in FIG. 1 was equipped with an ultraviolet lamp having an output of 0.9 watts of ultraviolet energy in the 1800 to 4000 A range. The sterilizer was clamped in position over a 20 gallon tank. Water from the tank was delivered to the sterilizer at a rate of 30 gallons per hour by the air lift tube. The air lift tube had an inside diameter of ¾ inches and air was introduced through the air stone at a rate of 30 cubic inches per minute. The air stone was at a depth of 8 inches. After UV treatment the water drained from the sterilizer and returned to the tank for recirculation.

The tank contained aquatic life. The total bacteria count before the test started was 1500 bacteria per mililiter. After 24 hours of UV sterilization the bacteria count of the water in the tank had dropped to 30 bacteria per mililiter yielding a killing efficiency of 98%.

While the invention has been disclosed by a specific example and emodiment, the invention is not limited to this particular form but is applicable broadly to all such variations that fall within the scope of the apended claims.

I claim:

1. a liquid sterilizer which comprises:
   a. an enclosure;
   b. an ultraviolet germicidal lamp suspended in the upper portion of said enclosure;
   c. A lower wall of said enclosure exposed to the radiation from the lamp said lower wall having at least one drain hole (and) the upper rim of said drain hole flush with the upper surface of the lower wall; and
   d. a means to deliver turbulent, aerated liquid to said lower wall causing the liquid to pass over the lower wall and to drain from the drain holes.

2. A sterilizer as recited in claim 1, wherein said means to deliver liquid is an air lift tube with the lower end of the tube immersed in the liquid to be sterlized and the upper end extending through said enclosure and having at least one discharge opening communicating with the inside of said enclosure the air being delivered through an air stone at the lower end of the tube and the air stone providing a multiplicity of fine bubbles causing a high degree of aeration and turbulance.

3. A sterilizer as recited in claim 2, wherein the discharge opening is closely spaced to a side wall of said enclosure for the purpose of breaking large air bubbles in the liquid before the bubbles pass under the ultraviolet lamp where bubble breakage can cause spattering of the lamp.

4. A sterilizer as recited in claim 3 having an ultraviolet reflecting surface comprising the upper wall of said enclosure said surface in view of said germicidal lamp for the purpose of increasing the ultraviolet energy delivered to the liquid.

* * * * *